UNITED STATES PATENT OFFICE.

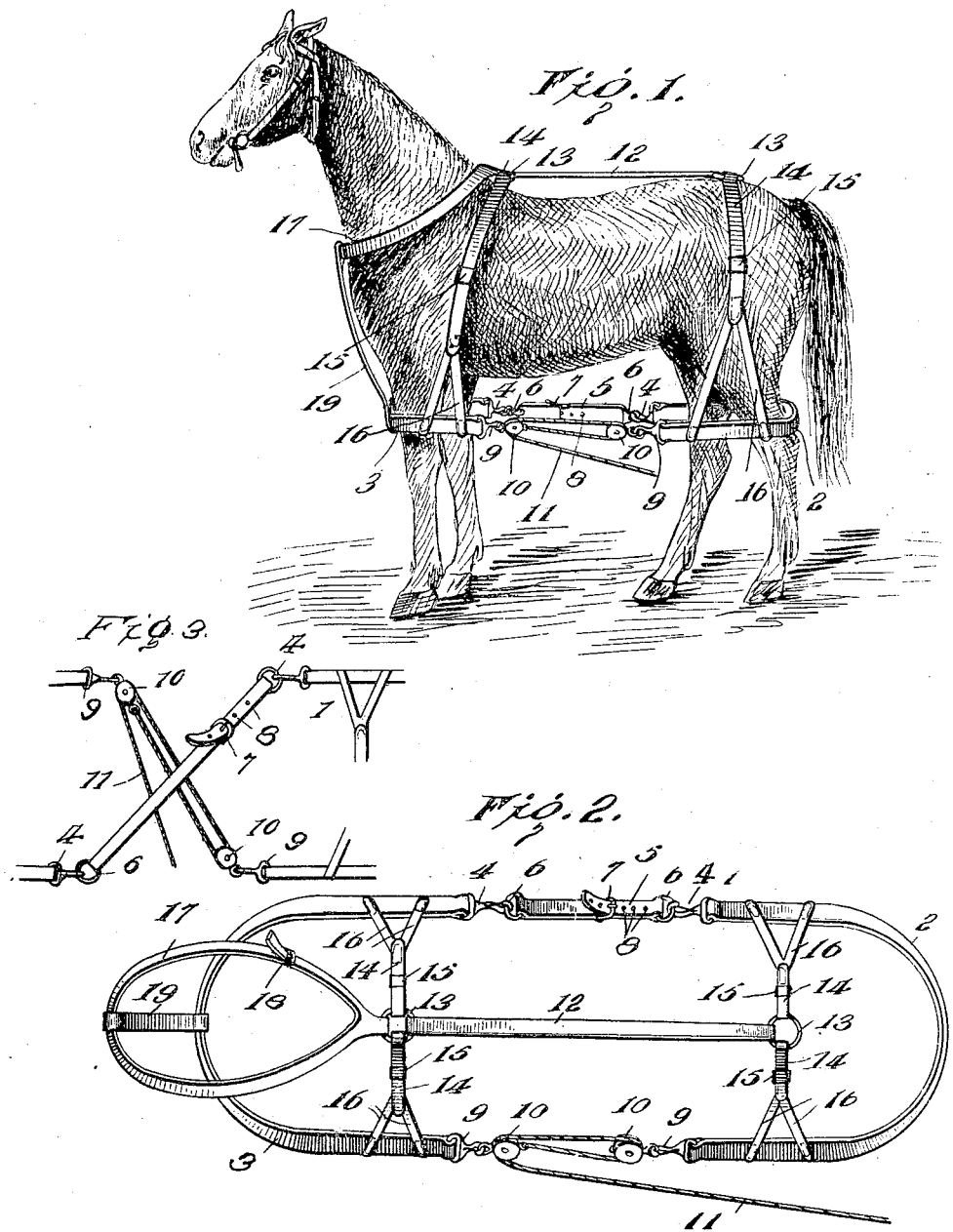

JOHN O. WESTROPE, OF WINNEMUCCA, NEVADA.

HORSE-CONTROLLING DEVICE.

No. 806,858.  Specification of Letters Patent.  Patented Dec. 12, 1905.

Application filed June 1, 1905. Serial No. 263,350.

*To all whom it may concern:*

Be it known that I, JOHN O. WESTROPE, a citizen of the United States, residing at Winnemucca, in the county of Humboldt and State of Nevada, have invented certain new and useful Improvements in Horse-Controlling devices, of which the following is a specification, reference being had therein to the accompanying drawings.

My invention relates to horse-controlling devices, and more particularly to a device especially adapted for use in breaking and training colts and handling vicious and unruly horses, one of the objects being to provide a device of the character described that shall be simple in construction, durable, and easy and effective of operation and adjustment.

A further object of the invention is to provide a device of the character described that can be used on any animal and by means of which said animal can be restrained or liberated at the will of the operator and also be prevented from kicking or jumping and, further, by means of which an animal can be easily thrown when necessary for performing operations or other purposes and can be held from arising and from kicking while in reclined position.

Other objects and advantages of my invention, as well as the structural features by means of which these objects are attained, will be made clear by an examination of the specification, taken in connection with the accompanying drawings, in which the same reference-numerals indicate corresponding portions throughout, and in which—

Figure 1 is a side elevation of my complete device, showing the same in position on a horse; and Fig. 2 is a top plan. Fig. 3 is a detail view of the adjustable strap-and-pulley connection, showing a modified arrangement thereof wherein they cross each other.

My device consists of a harness 1, in which 2 is a rear strap, and 3 a forward strap. These straps are curved, so that the rear strap passes around the hind legs of the animal and the strap 3 around the front legs, as shown in Fig. 1. The ends of these straps on one side of the animal are provided with snap-locks 4 and are adjustably connected by means of a strap 5, having rings 6, which engage with the snap-locks 4. This strap 5 has a buckle 7 secured to one end and holes 8 in the other end, whereby it is adjusted. Secured to the other ends of said straps 2 and 3 are snap-locks 9, to which block-pulleys 10 are secured. Attached to the block of one of said pulleys is a rope 11, said rope winding around the opposite pulley and then back over the pulley carried by the block to which it is secured and by means of which the harness is operated to restrain and control the animal, as will be hereinafter more fully described.

12 designates a back-strap having rings 13 secured to each end thereof.

14 designates adjustable side straps having buckles 15, whereby they are adjusted, and being also provided with the forked ends 16, the object of said side straps being to hold in elevated and adjusted position the straps 2 and 3.

Having one end secured to the forward ring 13 is a collar or yoke 17, which is adjusted by means of a buckle 18. Connecting the forward strap 3 with said collar or yoke 17 is a strap 19.

In operation the harness is placed upon the animal, as shown in Fig. 1, and the yoke 17 is adjusted to the required size by means of the buckle 18. The strap 19, which connects the strap 3 with the yoke, prevents said strap 3 from dropping down in front of the animal and also prevents the yoke or collar from sliding or shifting upward on the neck. By means of the buckles 15 the side straps supporting the rear and forward straps 2 and 3 are adjusted so as to bring said rear and forward straps at any desired height relative to the legs of the animal. The lower part of the harness is expanded or contracted by means of the adjustable strap 5 on one side and by means of the block-and-pulley arrangement on the other side, so that if the animal starts to kick or run the operator is able to shackle the legs by pulling on the rope 11, thus restraining the animal. When the animal becomes quiet and submissive, the legs may be slowly unshackled by gradually releasing the rope. It will thus be observed that by means of my said device hereinbefore described the most vicious and unruly animal can be easily controlled and subdued, and by means of the adjustable features of my harness the same can be made to fit animals of different sizes, as required.

It is obvious that the block-and-pulley arrangement can be attached to the harness and operated on either side of the animal by placing the adjustable strap 5 on the opposite side.

Another method of operation is to pass the block and pulley diagonally under the animal by securing one end to one of the snap-locks 4 and the other end to one of the snap-locks 9 and placing the adjustable strap 5 in a corresponding position, so that they cross each other beneath the animal in the form of an X. By this arrangement the straps 2 and 3 are not only drawn together longitudinally of the harness, but the ends thereof are brought closer together under the animal, thus more securely restraining it when the operator pulls upon the rope 11. If found necessary, the back-strap 12 and the strap 14, connecting the yoke 17 to the forward strap 3, may be made adjustable by a buckle or any other suitable means.

While I have shown and described a preferred embodiment of my invention, it is obvious that certain modifications of form and arrangement of parts will suggest themselves to the skilled operator and mechanic, which modifications and arrangements come well within the scope and spirit of my invention, and I do not, therefore, desire to be restricted to the exact arrangement and construction shown.

Having thus described my said invention, what I claim as new, and desire to secure by Letters Patent of the United States, is—

1. An animal-controlling device, comprising straps arranged to limit and restrain the action of the limbs of the animal, means for supporting the straps in a movable position, an adjustable strap passing beneath the body of the animal and connecting the limiting and restraining straps, and a pulley arrangement also passing beneath the body of the animal and connecting the limiting and restraining straps and affording means whereby said limiting and restraining straps are operated to limit the action of the limbs of the animal.

2. An animal-controlling device, comprising a harness, straps arranged to limit and restrain the action of the limbs of the animal, an adjustable strap passing under the body of the animal and connecting the limiting and restraining straps, and a pulley arrangement also passing under the body of the animal to connect the limiting and restraining straps and affording means for operating said straps.

3. An animal controlling and training device, comprising a harness, an adjustable strap passing diagonally beneath the body of the animal and adjustably connecting the two sides of the harness, and a block-and-pulley attachment connecting the two sides of the harness and passing diagonally beneath the body of the animal to cross the adjustable strap, the two forming an X, and by means of which the harness is operated to control and restrain the animal.

4. In a horse-controlling device, a harness comprising straps partly encircling the rear and front legs of the animal, means for adjustably supporting the straps in a horizontal position, means for adjustably connecting the ends of the straps on one side of the animal, and a block-and-pulley attachment whereby the other ends of said straps may be actuated and controlled.

5. In a horse-controlling device, a harness comprising straps partly encircling the rear and front legs of the animal, means for adjustably supporting the straps in a horizontal position, means for adjustably connecting the ends of the straps on one side of the animal, a block-and-pulley attachment whereby the other ends of said straps may be adjusted, and an adjustable yoke or collar.

In testimony whereof I hereunto affix my signature in presence of two witnesses.

JOHN O. WESTROPE.

Witnesses:
C. E. ROBINS,
J. H. HOYT.